United States Patent
Priyanto et al.

(10) Patent No.: US 11,758,479 B2
(45) Date of Patent: *Sep. 12, 2023

(54) METHODS FOR CONFIGURING RESOURCES FOR WAKE-UP SIGNAL TRANSMISSION, RELATED WIRELESS DEVICES AND RELATED NETWORK NODES

(71) Applicant: Sony Group Corporation, Tokyo (JP)

(72) Inventors: Basuki Priyanto, Lund (SE); Anders Berggren, Lund (SE); Nafiseh Mazloum, Lund (SE)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/763,144

(22) PCT Filed: Sep. 29, 2020

(86) PCT No.: PCT/EP2020/077242
§ 371 (c)(1),
(2) Date: Mar. 23, 2022

(87) PCT Pub. No.: WO2021/063952
PCT Pub. Date: Apr. 8, 2021

(65) Prior Publication Data
US 2022/0417851 A1    Dec. 29, 2022

(30) Foreign Application Priority Data

Oct. 2, 2019    (SE) .................................... 1951123-7

(51) Int. Cl.
*H04W 52/02*    (2009.01)
*H04L 5/00*    (2006.01)

(52) U.S. Cl.
CPC ......... *H04W 52/0219* (2013.01); *H04L 5/008* (2013.01); *H04L 5/0012* (2013.01); *H04L 5/0091* (2013.01); *H04W 52/0235* (2013.01)

(58) Field of Classification Search
CPC ... H04L 5/0005; H04L 5/0012; H04L 5/0033; H04L 5/0053; H04L 5/008; H04L 5/0091; H04L 52/0219; H04L 52/0235
See application file for complete search history.

(56) References Cited

U.S. PATENT DOCUMENTS

2019/0090191 A1    3/2019    Liu et al.
2019/0103950 A1*   4/2019    Liu ..................... H04W 56/001
(Continued)

FOREIGN PATENT DOCUMENTS

WO    2018204799 A    11/2018
WO    2019145437 A    8/2019

OTHER PUBLICATIONS

International Search Report and Written Opinion from corresponding International Application No. PCT/EP2020/077242, dated Jan. 20, 2021, 13 pages.
(Continued)

Primary Examiner — Gary Mui
(74) Attorney, Agent, or Firm — TUCKER ELLIS LLP

(57) ABSTRACT

A method, performed by a network node, is disclosed, for configuring resources to be used for Wake-Up Signal, WUS, transmission to a plurality of wireless device groups in the communications network. The method comprises obtaining a number of wireless device groups supported by the communications network. The method comprises allocating, based on the obtained number of wireless device groups supported by the communications network, one or more active resources, out of a set of available resources, for WUS for the number of wireless device groups. The method comprises determining, based on a set of resource configu-
(Continued)

ration criteria, a WUS resource configuration defining a mapping of the wireless device groups to the determined one or more active resources. The method comprises providing, to the wireless device, a set of resource configuration parameters indicative of the determined WUS configuration.

20 Claims, 9 Drawing Sheets

(56) References Cited

U.S. PATENT DOCUMENTS

| | | | | |
|---|---|---|---|---|
| 2019/0349856 | A1* | 11/2019 | Liu | H04W 72/0453 |
| 2020/0107267 | A1* | 4/2020 | Wu | H04W 52/0219 |
| 2020/0178176 | A1* | 6/2020 | Kim | H04W 52/0212 |
| 2021/0045056 | A1* | 2/2021 | Nam | H04W 52/0216 |
| 2021/0306953 | A1* | 9/2021 | Hwang | H04W 52/0235 |
| 2022/0167270 | A1* | 5/2022 | Ye | H04J 13/0062 |
| 2022/0174644 | A1* | 6/2022 | Shi | H04W 52/0229 |
| 2022/0217632 | A1* | 7/2022 | Åström | H04J 13/0062 |
| 2022/0353814 | A1* | 11/2022 | Takeda | H04W 72/1273 |
| 2022/0377666 | A1* | 11/2022 | Shi | H04W 52/0229 |

OTHER PUBLICATIONS

Lenovo et al.: "Ue-group wake-up signal for Rel-16 MTC"; 3GPP Draft; R1-1906277; vol. RAN WG1; dated May 13-17, 2019; 5 pages.
Qualcomm Incorporated: "Discussion on UE-group wake-up signal for MTC"; 3GPP Draft; R1-1809022; vol. RAN WG1; dated Aug. 20-24, 2018; 5 pages.
Sony: WUS aspects on grouping and mobility for efeMTC and feNB-IoT; 3GPP Draft; R-1803134; vol. RAN WG2; dated Feb. 26-Mar. 2, 2018; 6 pages.
ZTE Corporation et al.: "Further consideration on UE grouping for WUS"; 3GPP Draft; R2-1901488; vol. RAN WG2; dated Feb. 25-Mar. 1, 2019; 13 pages.
Qualcomm Incorporated: "Service based UE sub-grouping on wake-up signal channel"; 3GPP TSG RAN WG2; R2-1910465; dated Aug. 26-30, 2019; 5 pages.
NTT Docomo, Inc.: "Discussion on UE=group wake up signal in MTC" 3GPP TSG RAN WG1; R1-1909167; dated Aug. 26-30, 2019; 3 pages.
Huawei et al.: "Discussion on reply LS from SA2 on GWUS"; 3GPP TSG-RAN WG2; R2-1910177; dated Aug. 26-30, 2019; 7 pages.
Huawei; et al.: "Feasibility of MO/MT service type based WUS grouping"; 3GPP TSG-RAN WG2; R2-1906162; dated May 13-17, 2019; 4 pages.
Qualcomm Incorporated, UE-group wake-up signal for MTC [online], 3GPP TSG-RAN WGI #97 RI-1907568, May 9, 2019, [Apr. 20, 2023], <URL:https://www.3gpp.org/ftp/tsg_ran/wgl_rl1/TSGR1_97/Docs/R1-19 07568.zip >.
Qualcomn Incorporated, Feature lead summary of 6. 2. 1. 1 UE group MWUS [online], 3GPP TSG-RAN WGI #98 RI-1909394, Sep. 3, 2019, Apr. 20, 2023] , <URL:https://www.3gpp.org/ftp/tsg_ran/WG1_RL1/TSGR1_98/Docs/RI-1909394.zip).
Sony, UE-group wake-up signal for MTC [online], 3GPP TSG RAN WGI #98b RI-1910737, Oct. 4, 2019, [Apr. 20, 2023], <URL:https://www.3gpp.org/ftp/tsg_ran/WGI_RL1/TSGR1_98b/Docs/R1-1910737.zip).

* cited by examiner

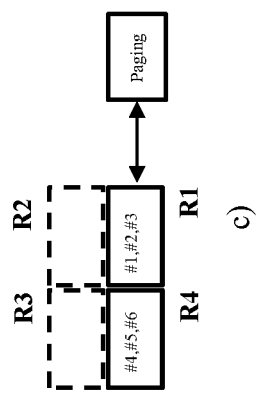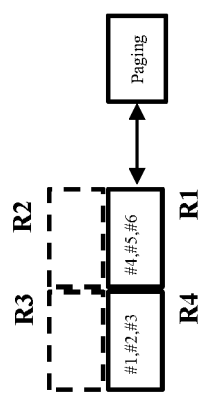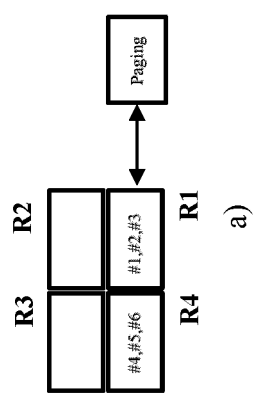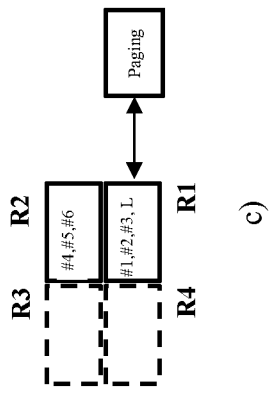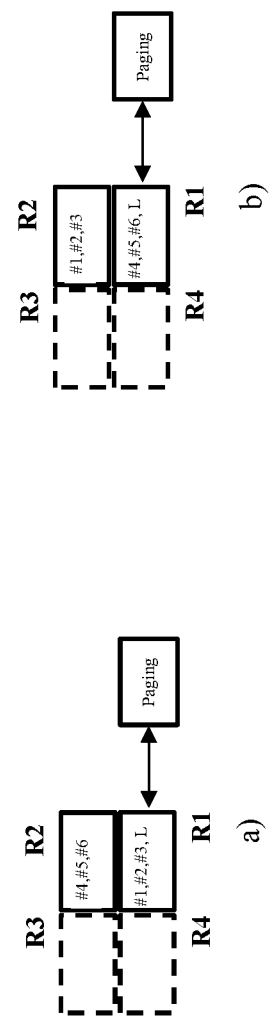
Fig. 2D
Fig. 2E

METHODS FOR CONFIGURING RESOURCES FOR WAKE-UP SIGNAL TRANSMISSION, RELATED WIRELESS DEVICES AND RELATED NETWORK NODES

The present disclosure pertains to the field of wireless communications. The present disclosure relates to methods for configuring resources for Wake-Up Signal (WUS) transmission to a plurality of wireless device groups, related wireless devices and related network nodes.

BACKGROUND

The $3^{rd}$ Generation Partnership Project, 3GPP, has received commercial success for Long Term Evolution (LTE) Machine-Type Communication (MTC) and Narrowband Internet of things (NB-IoT). The number of deployed networks and the volume of connected devices are undergoing a steady growth.

To support this growth and to improve the communication procedures in general, LTE systems are enhanced in Release 16 to further improve the network operation and efficiency on improved downlink (DL) transmission efficiency and user equipment (UE) power consumption.

This includes investigating wake-up signal and paging operations for optimization for a plurality of UEs.

In MTC/NB-IoT Release 15, a wake-up signal (WUS) is introduced in connection to paging operations in idle mode. The WUS is transmitted at a certain time and frequency instance, with a certain time offset, prior to a paging occasion. To detect the WUS, the UE listens for potential WUS by monitoring a channel at these instances. The UE continues to receive a paging message only if a WUS is detected.

SUMMARY

While the WUS in Rel. 15 reduces a channel monitoring cost for a UE in idle mode, an energy cost for a UE being woken up by listening to a WUS not intended for itself, which may also be referred to as overhearing, is high. To address this issue, WUS grouping is developed in Release 16, where only a certain number of UEs are to be woken up by a certain WUS associated with that certain number of UEs. The WUS grouping may be based on a paging probability of that the wireless devices and/or on a wireless device unique ID. Additionally, to be able to wake-up all groups or more than one group listening for potential WUS at the same time and frequency instance, Rel. 16 also allows to have a common WUS. The WUS may be transmitted in a plurality of different WUS resources. However, transmission conditions may vary between WUS resources and wireless device groups assigned to a first WUS resource may thus experience worse or better paging performance than wireless device groups assigned to a second WUS resource.

Accordingly, there is a need for methods, network nodes and wireless devices, which mitigate, alleviate or address the shortcomings existing and enable an improved mapping of WUS resources.

A method is disclosed, performed by a network node in a communications network, for configuring resources to be used for Wake-Up Signal (WUS) transmission to a plurality of wireless device groups in the communications network. The method comprises obtaining a number of wireless device groups supported by the communications network. The method comprises allocating, based on the obtained number of wireless device groups supported by the communications network, one or more active resources, out of a set of available resources, for WUS, for the number of wireless device groups. The method comprises determining, based on a set of resource configuration criteria, a WUS resource configuration defining a mapping of the wireless device groups to the determined one or more active resources. The wireless device groups mentioned herein may also be referred to as paging groups, i.e. a group of wireless devices that may be woken up with a common broadcasted WUS transmission and/or may be paged with a common broadcasted paging message. The method comprises providing, to the wireless device, a set of resource configuration parameters indicative of the determined WUS configuration.

Further, a method is disclosed, performed by a wireless device, for determining resources to monitor for Wake-Up Signals, WUS, from a network node. The method comprises obtaining, from the network node, a set of resource configuration parameters indicative of a WUS configuration. The method comprises obtaining, from the network node, a wireless device group identifier associated with the wireless device. The method comprises determining, based on the obtained set of resource configuration parameters, the wireless device group identifier and a set of resource configuration criteria, a WUS resource, out of one or more active resources, allocated to the wireless device. The method comprises monitoring the determined WUS resource for WUS.

Further, a network node is provided, the network node comprising a memory circuitry, a processor circuitry, and a wireless interface. The network node is configured to perform a method as disclosed herein.

Further, a wireless device is provided, the wireless device comprising a memory circuitry, a processor circuitry, and a wireless interface. The wireless device is configured to perform a method as disclosed herein.

It is an advantage of the present disclosure that the number of active WUS resources can be dynamically adapted to the number of wireless device groups available. By allocating a higher number of resources for WUS transmission, the number of wireless device groups mapped to each WUS resource may be reduced which reduces the risk of blocked WUS and false wake-up of wireless devices.

A further advantage is that, by determining a WUS resource configuration defining a mapping of the wireless device groups based on a set of resource configuration criteria and providing a set of resource configuration parameters indicative of the determined WUS configuration to the wireless device, the network node can perform a dynamic mapping of the wireless device groups to the available WUS resources. This leads to an adaptable mapping of the wireless device groups to the resources, whereby fairness with regards to transmission conditions for each wireless device group may be achieved. This further leads to an improved paging performance.

Determining the WUS resource configuration based on the set of resource configuration criteria also has the advantage that the determination of the WUS resource configuration is performed based on the same criteria in each network node and in each wireless device. This leads to an improved mobility for the wireless devices in WUS operation, since the wireless devices can determine the WUS configuration in a new cell and/or network node which the wireless device has moved to during idle mode based on the set of resource configuration criteria.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which:

FIG. 2D is a block diagram illustrating an exemplary dynamic mapping of wireless device groups to a set of resource for WUS signalling for providing fairness with regards to time-gap between WUS resources and paging occasion, FIG. 2E is a block diagram illustrating an exemplary dynamic mapping of wireless device groups to a set of resource for WUS signalling for providing fairness with regards to sharing resources with a legacy WUS.

DETAILED DESCRIPTION

Figure 1A:
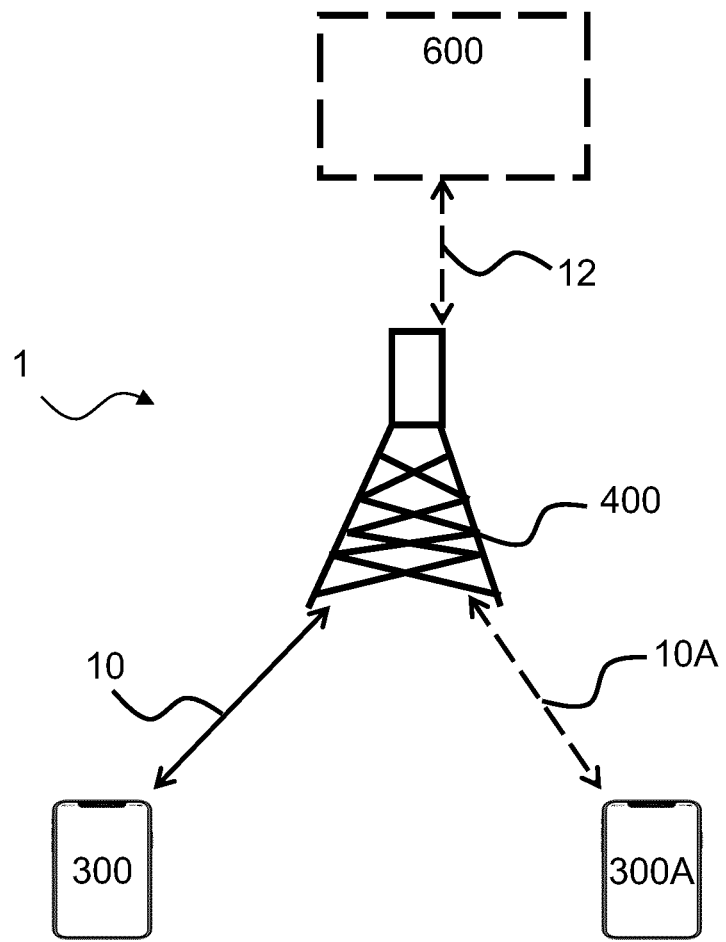
FIG. 1A is a diagram illustrating an exemplary wireless communication system comprising an exemplary network node and an exemplary wireless device according to this disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The figures are schematic and simplified for clarity, and they merely show details which aid understanding the disclosure, while other details have been left out. Throughout, the same reference numerals are used for identical or corresponding parts.

The present disclosure provides a method for mapping WUS for a plurality of wireless device groups, taking the availability of multiple groups and multiple resources into account. A set of rules are considered when determining the mapping, such as e.g. whether a common WUS resource or a shared WUS resources is used. The method is adapted to support fairness in paging performance such that e.g. a blocking of certain wireless device groups is avoided and false wake-up due to overhearing is reduced. The blocking effect may occur for example when two groups, one group of Rel 15 and one group of Rel 16, with high and low paging probabilities, are assigned to use the same WUS resource. The group with high paging probability will be paged more often, occupying the WUS resource very often. This can result in blocking of the WUS with lower paging probability when it needs to be paged. The method also provides mobility in WUS operation, particularly when a wireless device moves from one cell to another during idle mode.

FIG. 1A is a diagram illustrating an exemplary wireless communication system 1 comprising an exemplary network node 400 and an exemplary wireless device 300 according to this disclosure. The exemplary wireless communication system may further comprise an exemplary core network node 600, such as e.g. a Mobility Management Entity (MME).

As discussed in detail herein, the present disclosure relates to a wireless communication system 1 comprising a cellular system, e.g. a 3GPP wireless communication system. The wireless communication system 1 comprises one or more wireless device(s) 300, 300A and/or one or more radio network node(s) 400, such as one or more of: a base station, an eNB, a gNB and/or an access point.

The network node disclosed herein may be seen as a functional unit which may include a radio access network node 400 operating in the radio access network, such as a base station, an evolved Node B (eNB), or a global NodeB (gNB) and/or a core network node 600.

A wireless device may refer to a mobile device and/or a user equipment (UE). Optionally, the wireless device may comprise an Internet-of-things (IoT) device.

The wireless device 300, 300A may be configured to communicate with the network node 400 via a wireless link (or radio access link) 10, 10A.

In Machine Type Communications/Narrow Band Internet of Things (MTC/NB-IoT) Release 15, a wake-up signal (WUS) transmitted in connection to paging operation in idle mode has been introduced. The WUS is transmitted at a certain time and frequency instance, with a certain time offset, prior to the paging occasions. To detect the WUS, the wireless device listens for potential WUS by monitoring the channel at these instances. The wireless device continues receiving paging message only if a WUS is detected.

While the WUS in Release 15 reduces an "idle" channel monitoring cost, an energy cost of overhearing other wireless devices is relatively high. To address this issue, WUS grouping is developed in Release 16 where only a certain number of UEs are to be woken up by a certain WUS. Additionally, to be able to wake-up all groups or more than one group listening for potential WUS at the same time and frequency instance Rel. 16 also allows to have a common WUS.

In Release 16 new sets of WUS have been introduced, which may be referred to common WUS (C-WUS) and group WUS (G-WUS). In order to distinguish the release 15 WUS from the newly introduced C-WUS and G-WUS the WUS introduced in Release 15 may be referred to as legacy WUS (L-WUS). The G-WUS refers to a wake-up signal used to wake-up a specific wireless device group, the L-WUS refers to a wake-up signal to wake-up legacy wireless devices supporting Release 15 and the C-WUS refers to a wake-up signal for waking up all wireless devices that have been assigned to monitor the same WUS resource.

The WUS transmissions may occupy one or more physical resources in time and frequency which may be referred to as a WUS resource. In other words, a WUS resource may be seen as a physical resource, in time and frequency, used for WUS transmission. Two types of WUS resources may be defined, a dedicated WUS resource that is assigned either to Release 15 or to Release 16 WUS and a shared WUS resource that may be assigned to both Release 15 and Release 16 WUS.

However, considering there are multiple WUS transmissions at the same time, it has not been defined how the network node maps the WUS to the physical resources (WUS resource) and how it makes the wireless device aware of the mapping. The embodiments disclosed herein provide a method for determining a WUS resource configuration defining a mapping of the WUS transmissions for the wireless device groups to the determined one or more resources, such as to the active resources, such as to the active physical resources.

In Release 16, up to two orthogonal resources, including legacy WUS resource, are available and may be allocated for WUS in the time domain and up to two orthogonal resources are available and may be configured and/or allocated for WUS in the frequency domain. Both options may be combined so that up to four resources are available and may be configured and/or allocated simultaneously for WUS transmissions, including the legacy WUS resource. The resources for WUS transmission may be referred to interchangeably as WUS resources. Orthogonal resources herein shall be interpreted as each available resource having a different time and/or frequency allocation. Each WUS resource may e.g. support up-to eight wireless device groups.

Figure 1B:
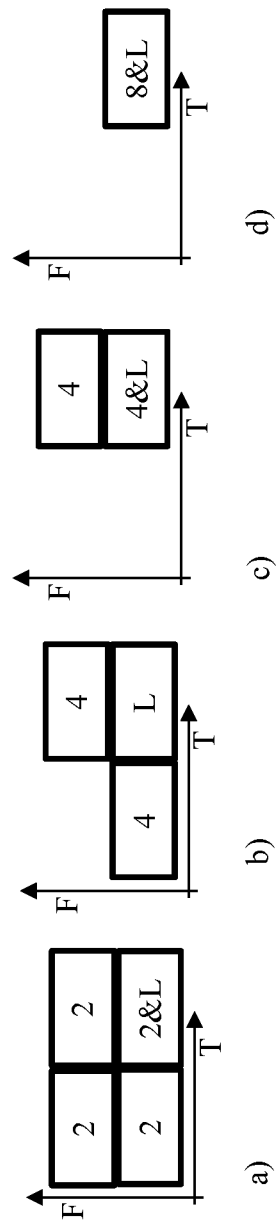
FIG. 1B is a diagram illustrating an allocation of resources for WUS signalling based on a number of wireless device groups.

A network node, such as e.g. a gNB or an eNB, may support up to e.g. thirty-two wireless device groups being distributed in all four orthogonal WUS resources. As discussed herein, different configurations may be used for multiplexing of Release 15 and Release 16 WUSs, as well as for Release 16 C-WUS and G-WUS. For instance, one of the available WUS resources may be configured to only be used for L-WUS, i.e. the L-WUS may be mapped to a dedicated WUS resource. The WUS resource may however also be shared between the L-WUS and the G-WUS and/or the C-WUS. Depending on the number of resources available for WUS transmission and the number of wireless device groups, the network node may map and multiplex WUS differently. FIG. 1B shows an example scenario according to the embodiments herein in which the network node supports eight Release 16 wireless device groups as well as legacy wireless device groups. Different possible mappings and configurations are illustrated in FIG. 1B (a) to FIG. 1B (d), in which figures resources used for legacy signaling are indicated with L and the resources used for Release 16 signaling are indicated with the number of wireless device groups assigned to each resource.

In one or more example embodiments, as shown in FIG. 1B (a), four resources are available for WUS and all four resources are used, which may also be referred to as being allocated, for WUS. Each WUS resource is assigned to support WUS for two wireless device groups, for example using G-WUS. Only one of the available resources is a shared WUS resource, i.e. it is used for both L-WUS and G-WUS/C-WUS.

FIG. 1B (b) illustrates an embodiment where only a part of all available WUS resources are allocated, in this case three out of four available WUS resources, and where one WUS resource is dedicated for Release 15 legacy WUS transmission. Hence, in this embodiment there are no shared resources. Having no shared resources has the benefit that no blocking of WUS transmission between legacy and release 16 WUS transmissions occur. FIG. 1B (c) and FIG. 1B (d) illustrate embodiments where even fewer number of resources are available and they are shared between Release 15 and Release 16 wireless device groups. In the embodiment shown in FIG. 1B (d), if the base-station decides to transmit L-WUS then the network node cannot wake-up the other eight wireless device groups using G-WUSs and vice versa. This blocking effect/issue may lead to extra delay since the network node has to wait until the next WUS resource is available. In case the network node transmits L-WUS then only the legacy UEs belonging to Release 15 wake up and continue to perform paging reception. Correspondingly, if the network node transmits G-WUS only one or all of the eight Release 16 wireless device groups will wake up and perform the reception of the paging signal.

For example, a wireless device that has been assigned in a shared WUS resource may face further issues. Depending on the network configuration and distribution of wireless devices, one wireless device group may comprise a larger number of wireless devices than the other wireless device groups. For example, if the number of wireless devices in the legacy group (group L) is significantly larger than the number of wireless devices in the eight groups, then there is a risk that the wireless devices in group L are being paged more often and thereby causing blocking to wireless devices in the eight Release 16 wireless device groups. Wireless device groups assigned to a non-shared WUS resource may thus have a better mapping than wireless device groups assigned to the shared WUS resource.

Furthermore, for example, if a wireless device is assigned to always listen to a first WUS resource in time it has a longer offset before the paging occasion. This extra time offset may lead to an extra energy cost for the wireless devices paged in the first WUS resource compared to wireless devices which always listen at the second WUS resource. Hence, embodiments herein aim at reducing these types of unfairness and/or energy cost by providing a fair and/or dynamic mapping of wireless device groups to the WUS resources.

The configuration/mapping procedure of WUS and its resources can strongly influence the possible energy saving and paging latency. Therefore, not only the base-station needs to have strategy to find a good trade-off but also it needs to notify the wireless device so that the wireless device is aware of the WUS resource configuration.

Furthermore, various network nodes in a network may be configured differently and have their own, which may be referred to as cell-specific, WUS resource configuration, and a wireless device may move from one network node to another during idle mode. Hence, if the wireless device is not aware of the WUS resource configuration in the new network node, which may also be referred to as a target network node, the wireless device may not be able to receive the WUS.

Figure 2:
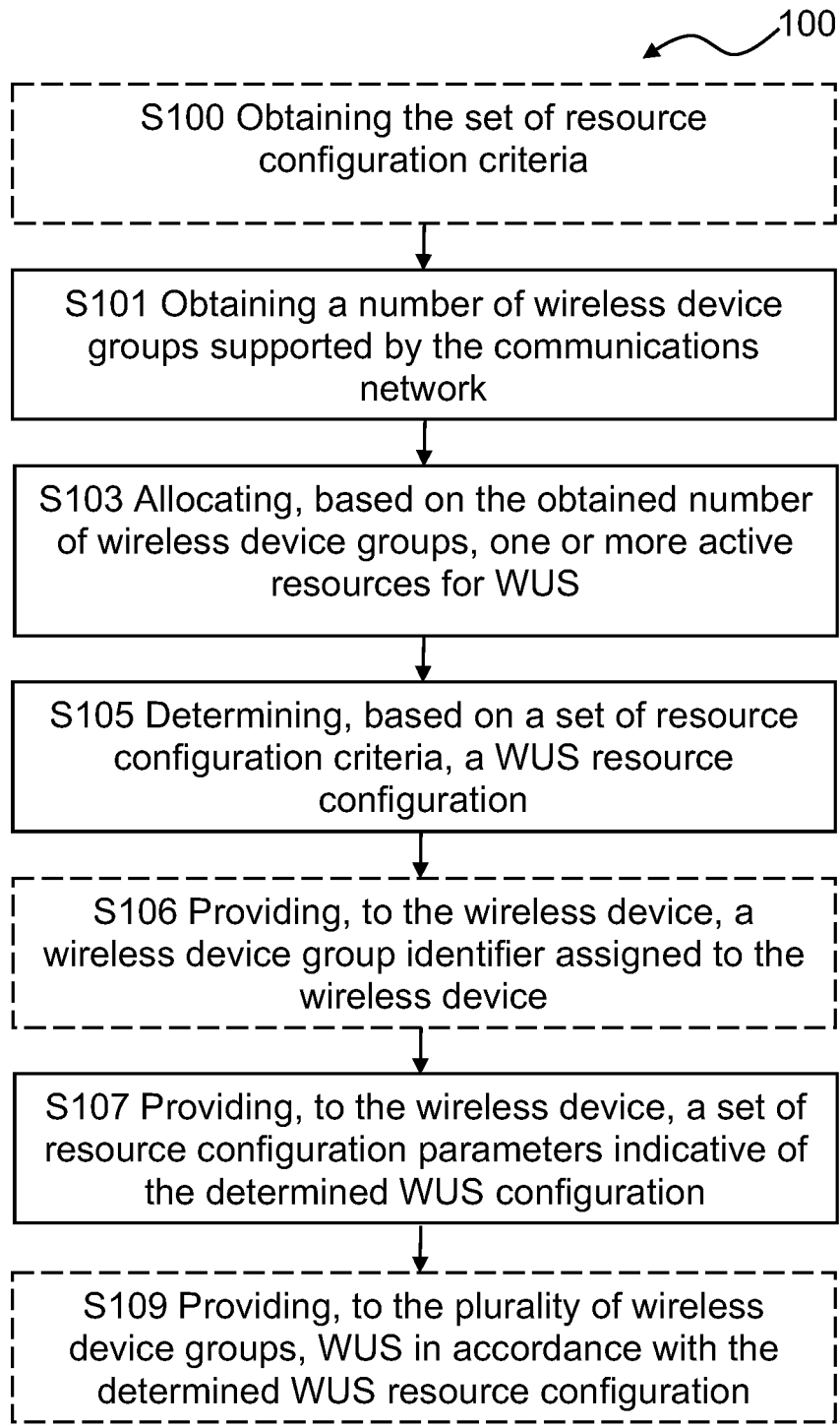
FIG. 2 is a flow-chart illustrating an exemplary method, performed in a network node, for configuring resources to be used for Wake-Up Signal, WUS, transmission to a plurality of wireless device groups in the communications network.

FIG. 2 shows a flow diagram of an exemplary method, performed by a network node according to the disclosure, for configuring resources to be used for Wakeup Signal, WUS, transmission to a plurality of wireless device groups in the communications network. The network node may e.g. be an eNB, a gNB and/or an MME. The network node is configured to communicate with a wireless device (such as a wireless device disclosed herein, such as wireless device 300 of FIG. 1A, FIGS. 3 and 5). Signalling between the network node and the wireless device is illustrated in FIG. 6. The method may be performed when the wireless device is in Idle mode, and/or Connected mode (e.g. when performing a handover from the network node to a target network node). For example, the wireless device may be camped in a cell controlled by the network node.

The method 100 may comprise obtaining S100 a set of resource configuration criteria.

A resource configuration criteria may be a predetermined configuration representing a set of rules to be used for WUS resource determination. The set of resource configuration criteria may comprise a set of resource allocation rules and a set of group mapping rules. The set of resource allocation rules may be related to allocating a set of active WUS resources out of the set of available resources. The set of group mapping rules may be related to mapping of the wireless device groups to the active resources. The set of resource configuration criteria may be fixed and/or may be pre-configured in the network node, and/or may be obtained from a second network node, such as e.g. a core network node.

The method 100 comprises obtaining S101 a number of wireless device groups supported by the communications network. The number of wireless device groups may e.g. be obtained by receiving the number of wireless device groups supported by the communications network from the core network node, such as e.g. the MME. Furthermore, the network node may obtain the number of wireless device groups supported by the communications network by manual configuration, e.g. by storing the number of wireless device group on a memory associated with the network node. The number of wireless device groups may be seen as the amount of wireless device groups to be considered by the network node.

The method 100 comprises allocating S103, based on the obtained number of wireless device groups supported by the communications network, one or more active resources, out of a set of available resources, for WUS for the number of wireless device groups. In other words, the network node determines which of the available resources should be used for WUS transmission and which should be spared for example for other purposes. The one or more active resources for WUS may be seen as the physical resource allocated for WUS transmission(s), such as one or more resources used for WUS transmission. The one or more active resources for WUS may be determined by applying the set of resource allocation rules comprised in the set of resource configuration criteria to the obtained number of wireless device groups. For example, the set of resource allocation rules provided by these parameters may e.g. consider a load in the cell, a channel quality, paging probability, etc. for determining how many and/or which resources out of the set of available resources that are active resources and thus may be allocated for WUS transmission. The set of available resources may comprise four orthogonal resources, wherein two orthogonal resources may be configured in the frequency domain and two orthogonal resources may be configured in the time domain.

The method 100 comprises determining S105, based on the set of resource configuration criteria, a WUS resource configuration defining the mapping of the wireless device groups to the determined one or more active resources. In one or more example methods, determining S105 the WUS resource configuration may be based on the set of resource configuration criteria obtained in S100. The WUS resource configuration may specify at least one out of:

which of the resources out of the set of available resources that are active resources,
the number of wireless device groups in each active resource,
a pattern defining how to map the wireless device groups to the active resources, and/or
whether the pattern is varying over time.

Each available resource in the set of available resources may be associated with a specific set of transmission conditions. The set of resource configuration criteria may be adapted to, over time, provide equivalent transmission conditions, which may also be referred to as fair transmission conditions, for WUS for all wireless device groups. The transmission conditions may relate to one or more of energy saving, signal quality, interference and/or paging latency for the wireless device groups. In some embodiments herein the set of resource configuration criteria may be adapted to provide more favourable transmission conditions for one or more prioritized wireless device groups. The set of resource configuration criteria may e.g. define that the prioritized wireless device groups is to be mapped in the resources providing the best transmission conditions. In some embodiments the resource configuration criteria may be adapted to provide a combination of favourable transmission conditions for the one or more prioritized wireless groups and fair transmission conditions for one or more non-prioritized and/or less prioritized wireless device groups. The set of resource configuration criteria may e.g. be adapted to map the one or more prioritized wireless device groups in an active WUS resource having the most favourable transmission conditions and may further be adapted to map the non-prioritized and/or less prioritized wireless device groups based on fair transmission conditions in one or more further active WUS resources.

In order for the wireless device to be able to determine the mapping of the wireless device groups to the WUS resources, the wireless device needs to be aware of the active WUS resource(s). The active WUS resources may be calculated by the wireless device based on a set of rules, such as e.g. the set of resource configuration criteria, or may be provided to the wireless device via a look-up table and/or through certain bit-mapping carried over signaling.

Figure 2A:
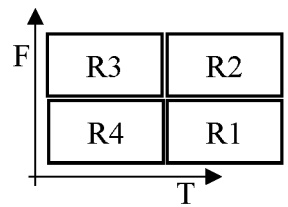
FIG. 2A is a block diagram illustrating an exemplary set of available resources for WUS transmission.

The allocating of the WUS resources may be facilitated by defining a set of parameters that are known by both the network node and the wireless device. These parameters may herein also be seen as implicit parameters, since they may be implicitly provided during configuration and may be retrieved from a memory of the network node and/or of the wireless device without having to be explicitly signaled to the network node and/or the wireless device prior to determining the configuration. Thereby, the signaling related to the WUS configuration may be reduced. The parameters may define a set of rules for determining the resource configuration and may be used by the network node and the wireless device to determine the mapping of the WUS resources. For example, the rules provided by these parameters may consider the load in the cell, the channel quality, etc. for determining how many and/or which resources out of the set of available resources that are active resources and thus may be allocated for WUS transmission. Thereby, no dedicated signaling may be required for the wireless device to know which rules to apply for determining the mapping in order to determine the mapping of the available WUS resources. The parameters may e.g. define one WUS resource as a WUS resource reference and further defining how a WUS pattern changes over time. For example, a legacy WUS resource, such as the WUS resource used in Rel. 15, may be used as the reference WUS resource. A mapping of the resources may be done in relation to this reference point. An example of the WUS resource allocation is illustrated in FIG. 2A. In FIG. 2A four resources are available for WUS, wherein two orthogonal resources are configured in the frequency domain and two orthogonal resources are configured in the time domain. In one or more example embodiments, as shown in FIG. 2A, a first WUS resource, herein referred to as R1, is the WUS resource reference and the numbering of the other three resources, herein referred to as R2, R3 and R4, is done counter clock-wise.

Another way of facilitating the mapping may be to define a WUS resource mapping numbering and/or bit pattern. For example, the available resources for WUS may be numbered R1-R4 as shown in FIG. 2A. If the network node decides to allocate all of the available resources, the resource pattern which may be indicated to the wireless device may be e.g. '1111'; while if only the resources R1 and R2 are allocated, the pattern may be e.g. '0001', and so on.

In some embodiments, a look-up table, possibly stored in the network node and/or wireless device respectively, may be provided which may cover possible combinations of number of active resources for WUS and bit pattern. An example of such a look-up table is shown below:

| Bit pattern | Num WUS resource | Resource combination |
|---|---|---|
| 0000 | 1 | R1 |
| 0001 | 2 | R1, R2 |
| 0010 |   | R2, R3 |
| 0011 |   | R3, R4 |
| 0100 |   | R4, R1 |
| 0101 |   | R1, R3 |
| 0110 |   | R2, R4 |
| 0111 | 3 | R1, R2, R3 |
| 1100 |   | R2, R3, R4 |
| 1101 |   | R3, R4, R1 |
| 1110 |   | R2, R1, R4 |
| 1111 | 4 | R1, R2, R3, R4 |

By providing the bit-pattern to the wireless device, the wireless device may determine which resources out of the set of available resources that are active resources by looking up the active resources in the look-up table.

The network node may indicate the WUS resource to monitor to the wireless device by providing (e.g. via control signalling) an index of the pattern indicating the WUS resource in the look-up table or by providing the bit pattern (e.g. via control signalling) indicating the active resource(s) for WUS.

By providing the bit-pattern to the wireless device, the wireless device may determine which resources out of the set of available resources that are active resources. In some embodiments the wireless device may determine the active resource it is mapped to, based on the number of wireless device groups mapped to each active WUS resource. Since one WUS resource may support up to eight wireless device groups in Release 16 the network node may provide a set of three bit string, wherein the set of three bit strings comprise one three bit string for each active WUS resource. The three bit string represents the number, from one to eight, of wireless device groups mapped to each of the WUS resources. The three bit strings for each active resource may e.g. be comprised in the set of resource configuration parameters provided from the network node to the wireless device. An example of the set of three bit strings is shown in the following:

WUS resource 1: 111 (which represents eight groups mapped to resource 1)
WUS resource 2: 000 (which represent one group mapped to resource 2)
WUS resource 3: 011 (which represents four groups mapped to resource 3)
WUS resource 4: 001 (which represents two groups mapped to resource 3)

Based on the three bit strings the wireless device may determine that the cell supports fifteen groups by summing up the number of wireless device groups mapped to each of the active resources. The wireless device may then determine which active resource it should monitor based on the set of resource configuration criteria and/or the wireless device group identifier associated with the wireless device. The set of configuration criteria may e.g. define a rule stating that the wireless device groups 1-n are to be mapped in their corresponding order, such as e.g. mapping the wireless device group 1 to a first active resource, e.g. active resource 1. The subsequent wireless device groups 2-n may further be defined to be mapped to the first active resource until the number of resources indicated by the three bit string is met. In the example shown above, the first resource may have eight mapped wireless device groups and thus the wireless device groups 1-8 are mapped to the active resource 1. The subsequent wireless device groups 9-n are mapped to the next active resource, in this example resource 2, until the number of mapped wireless device groups according to the three bit string is met. Hence, in this example one wireless device group, namely group 9, is mapped to the active resource two. By applying the rule defined in the set of resource configuration criteria, the wireless device may determine the active resource to monitor based on the tree bit string and the wireless device group identifier. If e.g. the wireless device group identifier indicates that the wireless device is associated with wireless device group 9, then the wireless device may determine, based on the rule, that it should monitor active resource 2 for WUS. If the wireless device group identifier indicates that the wireless device is associated with wireless device group 13 on the other hand, then the wireless device may determine, based on the rule, that it should monitor active resource 3, and so on.

Another example is the case where the number of groups in each WUS resource is equally distributed. Assuming the number of supported groups is 8 and there are 4 WUS resources then it is understood that each WUS resource contains 2 groups. Hence, explicit signaling may not be required.

The mapping of the wireless device groups to the active resources, as described above, may be static or dynamic. Static mapping shall herein be interpreted as the pattern defining how to map the wireless devices is not changing over time, while the dynamic mapping shall be interpreted as the pattern defining how to map the wireless devices is changing over time. Therefore, an indicator may be provided to the wireless device indicating whether a dynamic mapping or a static mapping is used, i.e. whether the pattern varies over time.

Figure 2B:
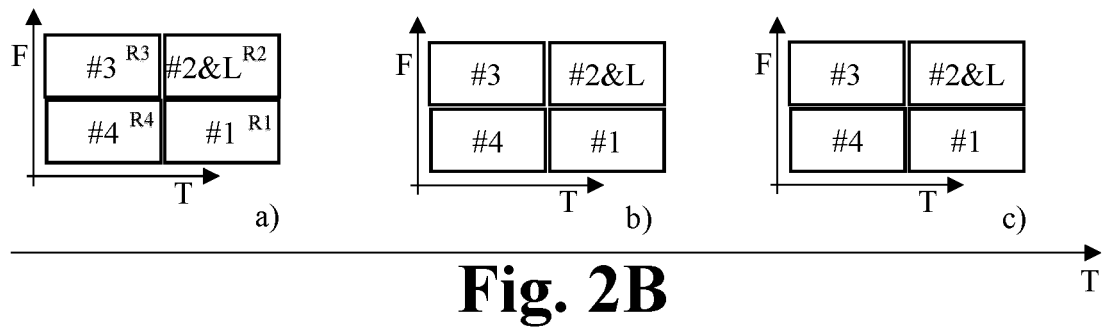
FIG. 2B is a block diagram illustrating an exemplary static mapping of wireless device groups to a set of resources for WUS signalling.

In the case of static allocation, such as e.g. static mapping, the WUS mapping does not change and it follows the same mapping over a certain time period. An example of this is shown in FIG. 2B where the resource numbering is the same over time. In one or more example embodiments, as shown in FIG. 2B, the wireless device group #2 may always be mapped to the WUS resource shared with the legacy wireless device group L.

Figure 2C:
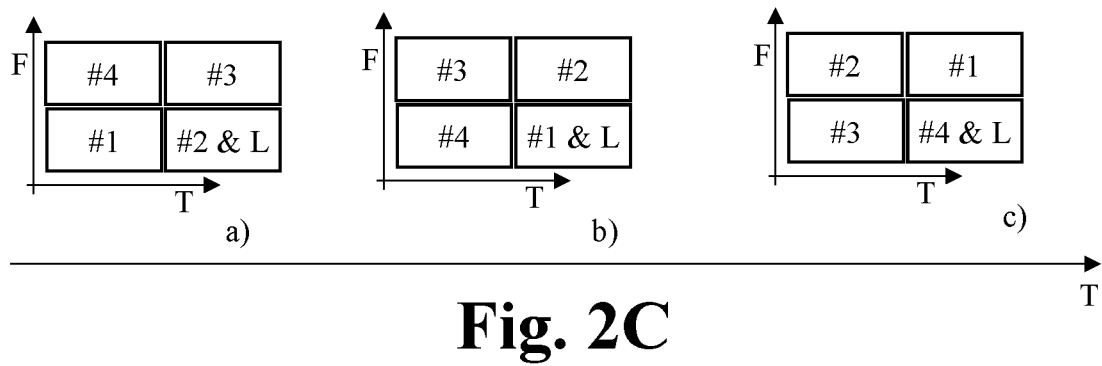
FIG. 2C is a block diagram illustrating an exemplary dynamic mapping of wireless device groups to a set of resources for WUS signalling

In the dynamic allocation (e.g. dynamic mapping), the WUS resource to which a group WUS is mapped may change with some certain pattern over time. An example of dynamic mapping of the wireless device groups to the WUS resources is illustrated in FIG. 2C. In the dynamic configuration, the resource to which a group WUS is mapped may be dynamically changed with a certain pattern such as by frequency hopping, time hopping, and/or rotation in the time and frequency domain. The rotation of the mapping may be performed in a clock-wise or counter clock-wise manner. In one or more example embodiments, as shown in FIG. 2C, the wireless device groups mapped to the same resource as the legacy wireless device group changes over time. For example, at a first paging occasion, the wireless device group #2 is mapped to the same resource as the legacy wireless device group L, for the next paging occasion the wireless device groups #1-4 have performed a time/frequency hop in a counter clock-wise direction and hence the wireless device group #1 is now mapped to the shared resource with the legacy wireless device group. For example, for the next paging occasion, the wireless device groups #1-4 perform a further time and/or frequency hop, according to the previous pattern, which results in wireless device group #4 being mapped to the shared resource together with the legacy wireless device group L.

FIGS. 2D and 2E disclose two exemplary ways of changing, which may also be referred to as altering, the dynamic mapping.

In one or more example embodiments, as shown in FIG. 2D, the change of the mapping of the wireless device groups aims towards group fairness with regards to a time-gap between the WUS resources and the paging occasion. For example, two resources have been allocated for WUS signaling, namely the resources R1 and R4, which have the same frequency allocation but have different allocations in time. Since the resource R4 is located in an earlier time frame than the resource R1, wireless devices in groups mapped to R4 will receive the WUS signal earlier than the wireless devices in groups mapped to R1 and will thus be awake for a longer time than the wireless devices mapped to R1. This may lead to an increased energy consumption for the wireless devices mapped to R4. In order to provide fair, which may also be referred to as equal, transmission conditions for all wireless device groups, the dynamic mapping according to one or more example embodiments shown in FIG. 2D provides a pattern wherein the wireless device groups mapped to each of the resources R1 and R4 is altered. As can be seen in FIG. 2D (a) the wireless device groups #4-#6 are mapped to resource R4 and the wireless device groups #1-#3 are mapped to resource R1 at a first paging occasion. Hence, the wireless device groups #4-#6 may end up having worse conditions than the wireless device groups #1-#3 with regards to the energy consumption. To compensate for this, the mapping of the wireless device groups may be altered for the next paging occasion, as shown in FIG. 2D (b), so that the wireless device groups #4-#6 are now mapped to the more beneficial resource R1 and the wireless device groups #1-#3 are mapped to the resource R4. For the next paging occasion, as shown in FIG. 2D (c), the mapping may follow this pattern and may change the mapping back to the initial mapping as shown in FIG. 2D (a).

In one or more example embodiments, as shown in FIG. 2E, the change of the mapping of the wireless device groups aims towards group fairness with regards to sharing a WUS resource with the legacy WUS. For example, two resources have been allocated for WUS signaling, namely the resources R1 and R2, which have the same allocation in time but different frequency allocations. In this embodiment the resource R1 is a legacy resource used for WUS transmission to legacy wireless device groups L. If there are many wireless device being paged in the legacy group, this may lead to blocking of the WUS transmissions to other wireless device groups mapped to resource R1. These wireless device groups may end up suffering worse transmission conditions than wireless device groups mapped to resources other than the legacy resource. In order to improve and provide fair transmission conditions for all wireless device groups, the dynamic mapping according to the one or more example embodiments shown in FIG. 2E provides a pattern wherein the wireless device groups mapped to each of the resources R1 and R2 is altered in the frequency domain. As can be seen in FIG. 2E (a) the wireless device groups #4-#6 are mapped to resource R2 and the wireless device groups #1-#3 are mapped to resource R1 shared with the legacy wireless device group L at a first paging occasion. Hence, the wireless device groups #1-#3 may end up having worse conditions than the wireless device groups #4-#6 with regards to the blocking. To compensate for this, the mapping of the wireless device groups may be altered for the next paging occasion, as shown in FIG. 2E (b), so that the wireless device groups #1-#3 may be mapped to the more beneficial resource R2 and the wireless device groups #4-#6 may be mapped to the resource R1. For the next paging occasion, shown in FIG. 2E (c), the mapping may follow this pattern and may change back to the initial mapping, as shown in FIG. 2E (a)

Although the examples shown in FIGS. 2D and 2E only disclose two active resources, the method proposed herein may also be applied when all WUS resources are active, and may comprise a combination of the time and frequency hopping disclosed in FIGS. 2D and 2E.

In order to reduce signalling, the wireless devices may benefit from not having to be told every-time the mapping of the wireless device groups is changed. Instead, according to the one or more example embodiments disclosed herein, a set of rules may be defined, e.g. in the resource configuration criteria, such that, in case the dynamic mapping is used and has been indicated to the wireless device, the wireless device can derive when and/or where to monitor its own WUS group, e.g.:

1) Based on a timing reference. For example, if an SFN mod 2 is an odd number then the wireless device group 1 should monitor R1 and if it is an even number then UE group 1 shall monitor R4 (for the scenario shown in FIG. 2D) or R2 (for the scenario shown in FIG. 2E).

2) Based on a previous attempt. If at a time T_m, the wireless device monitors resource R1, then at T_m+1 the wireless device shall monitor R4 (for the scenario shown in FIG. 2D) or R2 (for the scenario shown in FIG. 2E).

The set of rules for changing the dynamic mapping may be based on one or more of the following options:

1) A reference point, such as a reference resource, where this reference point may depend on an initial WUS allocation or previous WUS resource. The change of the mapping may e.g. be indicated as an offset from this reference point. The reference point and/or the offset may be provided to the wireless device and/or to the network node as an implicit parameter, e.g. upon initial configuration, or may be signaled.

The reference point may be a reference point in time, such as based on a System Frame Number (SFN). X=mod (SFNnum, N), e.g. X=SFNnum mod(N), where SFNnum indicates the initial system frame in which the WUS resource for the wireless device is located and N may indicate the number of active resources for WUS transmission. Depending on the number of active WUS resources, the reference point may e.g. become a number between 0 and N−1, where the highest value of N is 4. N may be a predefined in the specification and may be provided to the wireless device and/or to the network node as an implicit parameter, e.g. upon initial configuration, or may be determined by the network node and signaled to the wireless device. X may be seen as indicating the resource to be monitored by the wireless device for an upcoming WUS, such as e.g. an offset in time, which may be defined by a number of SFN frames, from the reference point in time.

2) Parameters included in $C_{init}$ (one of WUS parameter in Rel. 15). $C_{init}$ currently is a function of $N_n$, $N_f$ and $N_p$ which represent paging narrow band, frame number and paging occasion in Rel 15. By making $C_{init}$ be also a function of $X_{tinst}$ and $X_{finst}$ which are time and frequency instance within available WUS resources the mapping can be dynamically controlled. The next WUS resource to monitor for WUS may be determined by calculating $C_{init} = C_{init} + f(X_{tinit} + alfa) + g(beta * X_{finit})$, where alfa corresponds to an offset in the time domain and beta corresponds to an offset/factor in the frequency domain.

The method 100 comprises providing S107, to the wireless device, a set of resource configuration parameters indicative of the determined WUS configuration. The set of resource configuration parameters provided to the wireless device are indicative of one or more of: how many of the available resources are active resources, which resources out of the set of available resources that are active resources, a pattern defining how to map the wireless device groups to the active resources, and/or whether the pattern is varying over time. The pattern defining how to map the wireless device groups may herein also be referred to as a mapping pattern. In some embodiments, a subset of the resource configuration parameters may be provided to the wireless device as implicit parameters upon e.g. initial configuration of the wireless device. The subset of the resource configuration parameters may e.g. specify that the WUS resource assigned to a specific wireless device group makes a time and/or frequency hop between each paging occasion, and also in which way, i.e. in which pattern, the time/frequency hop is performed. By being aware of the pattern of the time and/or frequency hopping, the wireless device may determine which WUS resource it should monitor for WUS.

The network node may indicate the mapping configuration to the wireless device, comprising whether the mapping configuration is static or dynamic, i.e. whether it varies over time or not.

The network node may broadcast (e.g. via system information) the set of resource configuration parameters indicating a WUS cell-specific configuration. The set of resource configuration parameters may comprise the mapping configuration, whether the mapping configuration is static or dynamic, and/or the active WUS resources. The network node may also inform the wireless devices which wireless device groups are supported in each WUS resource. If the wireless device groups are uniformly distributed in the WUS resources, the network node may only provide the WUS resource density, i.e. the number of wireless device groups/WUS resource.

When the pattern is varying over time, i.e. when the mapping is dynamic, the set of resource configuration parameters may further be indicative of how the mapping pattern varies over time. The set of resource configuration parameters may be values or an index on a table comprising multiple available resource configurations.

The method 100 may further comprise providing S106, to the wireless device, a wireless device group identifier assigned to the wireless device. The network node may provide the wireless device group identifier, herein also referred to as a UE WUS group ID, to the wireless device via higher layer signaling, e.g. by forwarding the wireless device group identifier from the MME.

The method 100 may further comprise transmitting S109 to the plurality of wireless device groups, WUS in accordance with the determined WUS resource configuration.

Figure 3:
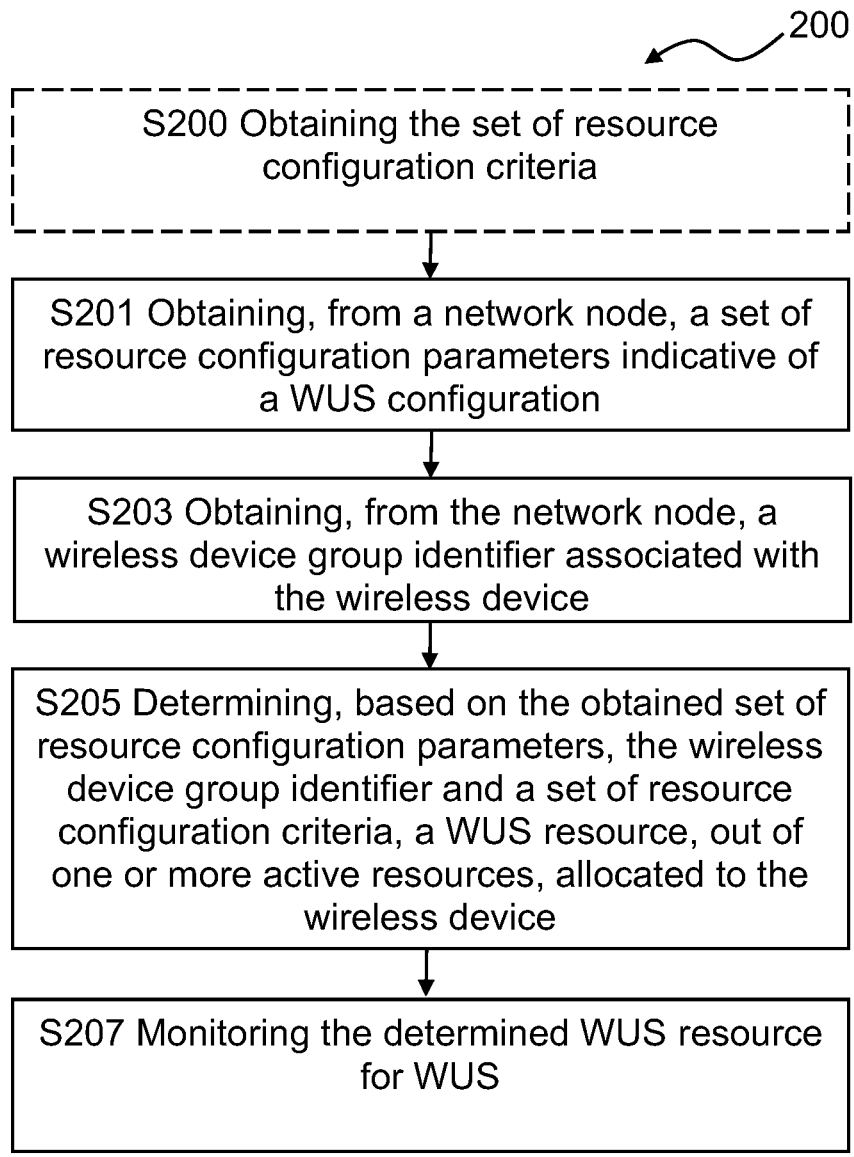
FIG. 3 is a flow-chart illustrating an exemplary method, performed in a wireless device, for determining resources to monitor for Wake-Up Signals, WUS, from a network node.
Figure 5:
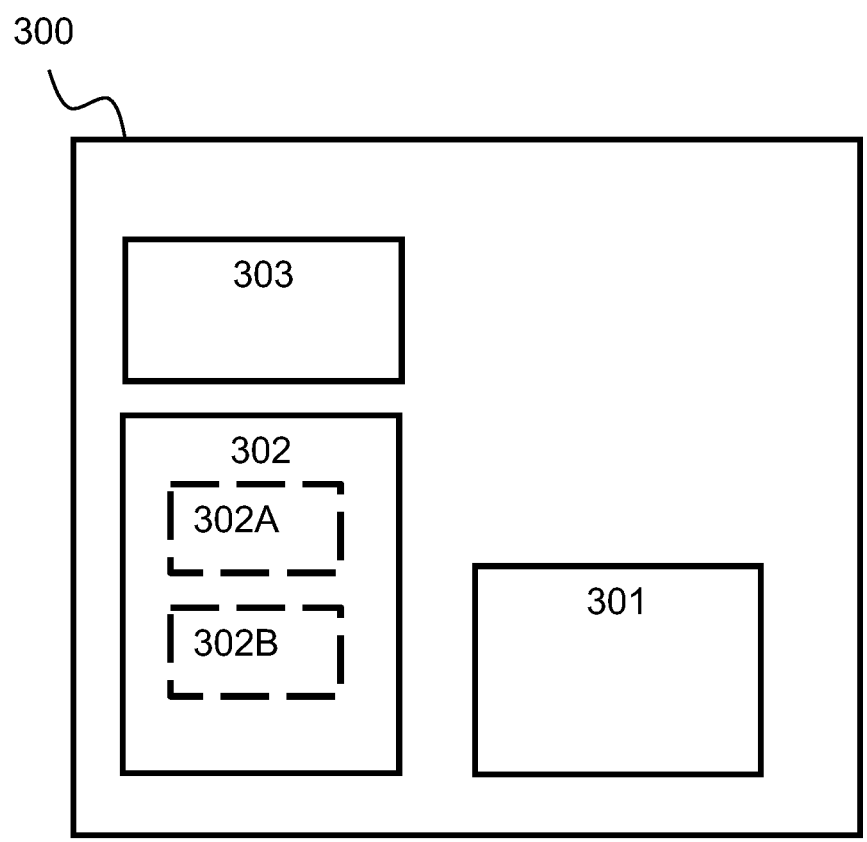
FIG. 5 is a block diagram illustrating an exemplary network node according to this disclosure.
Figure 6:
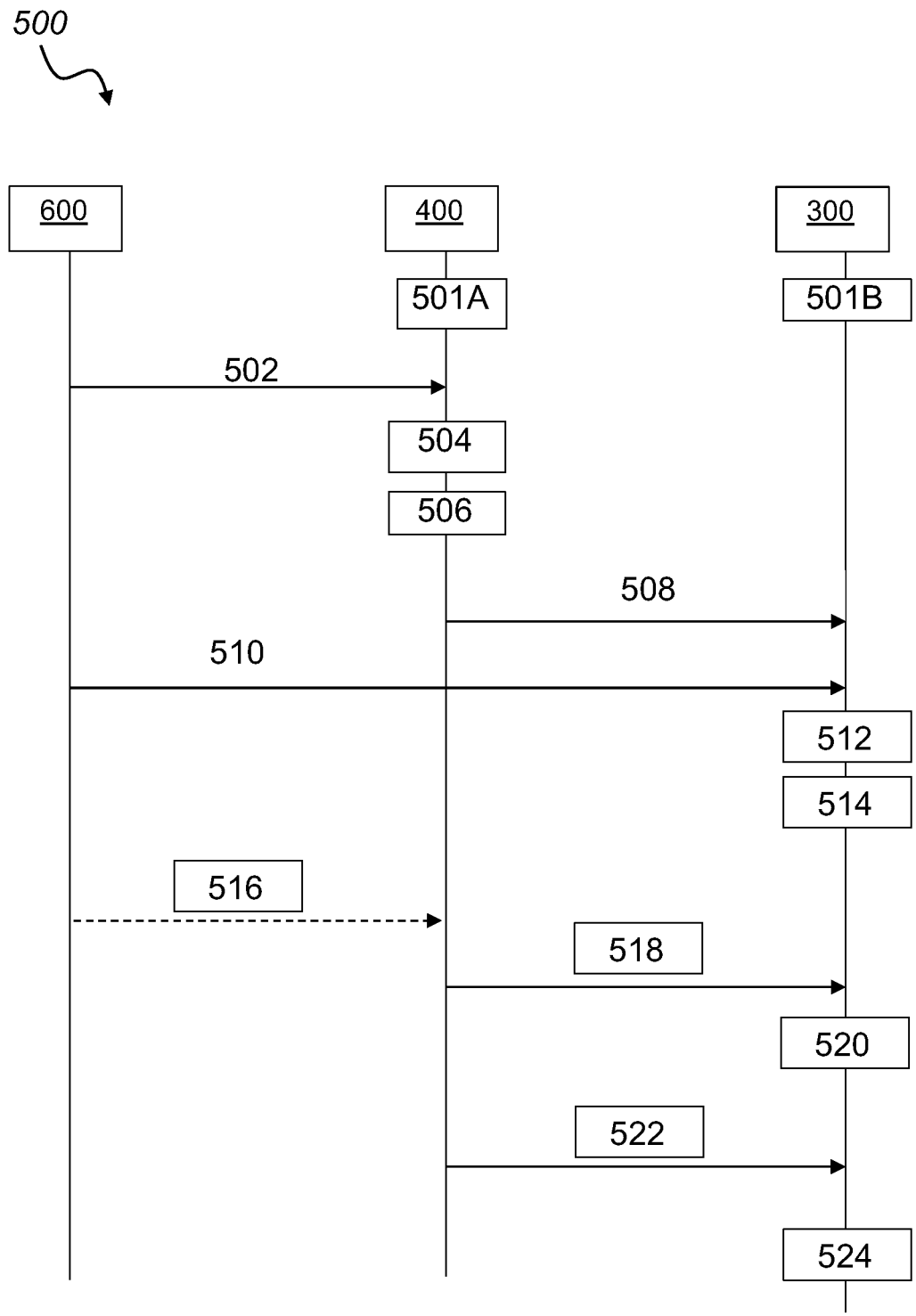
FIG. 6 is a signalling diagram illustrating an exemplary procedure for configuring resources for WUS.

FIG. 3 shows a flow diagram of an exemplary method, performed by a wireless device for determining resources to monitor for WUS from a network node (such as a network node disclosed herein, such as network node 400 or 600 of FIG. 1A, network node of FIG. 2 and network node 400 of FIG. 5). The method 200 comprises obtaining S201, from the network node, a set of resource configuration parameters indicative of a WUS configuration. The set of resource configuration parameters obtained from the network node may be indicative of one or more of how many resources, out of a set of available resources, are active resources, which resources, out of the set of available resources that are active resources, the number of wireless device groups for each active resource, a pattern defining how to map the wireless device groups to the active resources, and/or whether the pattern is varying over time. When the pattern is varying over time, the set of resource configuration parameters may further be indicative of how the pattern varies over time. For example, the wireless device may obtain the set of resource configuration parameters provided from the network node in S107 of FIG. 2.

The method 200 comprises obtaining S203, from the network node, a wireless device group identifier associated with the wireless device. The wireless device group identifier may herein be referred to as a UE WUS group ID. For example, the wireless device may obtain the wireless device group identifier provided from the network node in S106 of FIG. 2. Furthermore, the wireless device may obtain the wireless device group identifier associated to the wireless device by deriving it based on one or more parameters received from the network node and its own wireless device unique identifier (ID). For example, if the supported number of groups is P then the wireless device may determine the wireless device group by means of a modulo (mod) operation, such that the group identified may be the wireless device unique ID mod P.

The method 200 comprises determining S205 a WUS resource, out of one or more active resources, allocated to the wireless device. The WUS resource allocated to the wireless device herein refers to the WUS resource to which the wireless device is mapped. The determining of the WUS resource is based on the obtained set of resource configuration parameters, the wireless device group identifier and a set of resource configuration criteria. The WUS resource allocated to the wireless device is the WUS resource that the UE has to monitor for a potential WUS transmission. The set of resource configuration criteria may be designed to provide equivalent WUS conditions for all wireless devices of the wireless device groups. The WUS conditions may relate to energy saving, signal quality, paging probability and/or paging latency for the wireless device groups. Based on the above information (such as the predetermined configuration provided by the set of resource configuration criteria, the number of supported wireless device groups, the indication whether the mapping of the wireless device groups to the WUS resources is static or dynamic, and/or the wireless device group ID associated with the wireless device) the wireless device may derive the WUS resource that needs to be monitored for potential WUS transmission.

In some embodiments, the set of resource configuration criteria may be a predetermined configuration representing a set of rules to be used for the WUS resource determination. The set of resource configuration criteria may comprise a set of resource allocation rules and a set of group mapping rules. The set of group mapping rules defines the mapping between the wireless device groups and the active resources, given 1) the number of wireless device groups, 2) a certain pattern of allocated resources for transmitting WUS, and 3) whether the mapping of the wireless devices to the active resources for transmitting WUS is dynamic or static. These three parameters may either be provided in the resource configuration parameters or may be fix (defined as a part of the rules and/or assumed by standard). For example, if the same pattern is always used, then an index corresponding to the active resources is signalled to the wireless device and the mapping may be determined based on the active resources and the three parameters 1)-3) mentioned above.

The method 200 comprises monitoring S207 the determined WUS resource for WUS.

Figure 4:
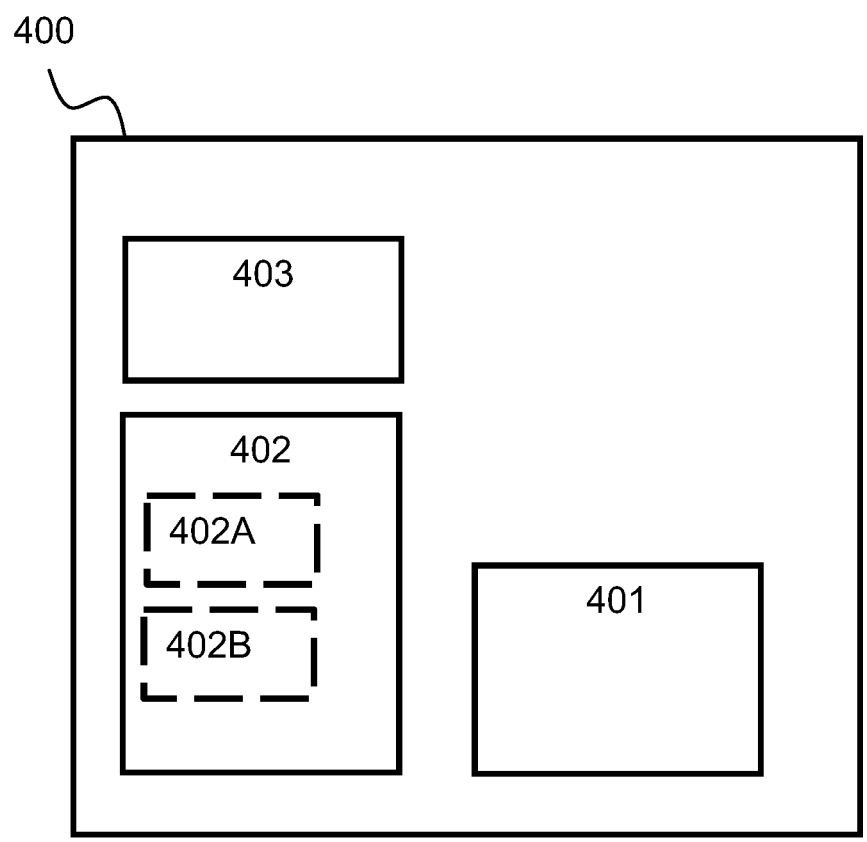
FIG. 4 is a block diagram illustrating an exemplary wireless device according to this disclosure.

FIG. 4 shows a block diagram of an exemplary network node 400 according to the disclosure. The present disclosure relates to a network node 400 of a wireless communication system. Examples of a network node include a radio access network node, a base station, an evolved NodeB (eNB), a global NodeB (gNB), a core network node and/or an access point.

The network node 400 comprises a memory circuitry 401, a processor circuitry 402, and a wireless interface 403. The network node 400 is configured to perform any of the methods disclosed herein, such as any of the methods shown in FIG. 2.

The network node 400 is configured to obtain (e.g. via the wireless interface 403) a number of wireless device groups supported by the communications network.

The network node 400 is configured to allocate (e.g. via an allocating circuitry 402A), based on the obtained number of wireless device groups supported by the communications network, one or more active resources, out of a set of available resources, for WUS for the number of wireless device groups.

The network node 400 is configured to determine (e.g. via the processor circuitry 402 or via a determining circuitry 402B), based on a set of resource configuration criteria, a WUS resource configuration defining a mapping of the wireless device groups to the determined one or more active resources.

The network node 400 is configured to provide (e.g. via the wireless interface 403), to the wireless device, the set of resource configuration parameters indicative of the determined WUS configuration.

The network node 400 is configured to transmit (e.g. via the wireless interface 403), to the plurality of wireless device groups, WUS in accordance with the determined WUS resource configuration.

The network node 400 may further be configured to provide (e.g. via the wireless interface 403), to the wireless device, a wireless device group identifier assigned to the wireless device.

The network node 400 may further be configured to obtain the set of resource configuration criteria.

The network node 400 is configured to optionally perform any of the steps S100, S101, S103, S105, S107, S109 of FIG. 2.

The wireless interface 403 is configured for wireless communications via a wireless communication system, such as a 3GPP system, such as a 3GPP system with MTC and/or NB-IoT communications.

The processor circuitry 402 may optionally be configured to perform any of the operations disclosed in FIG. 2. The operations of the network node 400 may be embodied in the form of executable logic routines (e.g., lines of code, software programs, etc.) that are stored on a non-transitory computer readable medium (e.g., the memory circuitry 401) and are executed by the processor circuitry 402.

Furthermore, the operations of the network node 400 may be considered a method that the network node 400 is configured to carry out. Also, while the described functions and operations may be implemented in software, such functionality may as well be carried out via dedicated hardware or firmware, or some combination of hardware, firmware and/or software.

The memory circuitry 401 may be one or more of a buffer, a flash memory, a hard drive, a removable media, a volatile memory, a non-volatile memory, a random access memory (RAM), or another suitable device. In a typical arrangement, the memory circuitry 401 may include a non-volatile memory for long term data storage and a volatile memory that functions as system memory for the processor circuitry 402. The memory circuitry 401 may exchange data with the processor circuitry 402 over a data bus. Control lines and an address bus between the memory circuitry 401 and the processor circuitry 402 may also be present (not shown in FIG. 4). The memory circuitry 401 is considered a non-transitory computer readable medium.

The memory circuitry 401 may be configured to store the obtained set of resource configuration parameters, the wireless device group identifier and/or the set of resource configuration criteria, in a part of the memory based on the received software data.

FIG. 5 shows a block diagram of an exemplary wireless device 300 according to the disclosure. The wireless device 300 comprises a memory circuitry 301, a processor circuitry 302, and a wireless interface 303. The wireless device 300 may be configured to perform any of the methods disclosed in FIG. 3.

The wireless device 300 is configured to communicate with a network node, such as the network node 400 disclosed herein, using a wireless communication system. The wireless interface 303 is configured for wireless communications via a wireless communication system, such as a 3GPP system, such as a 3GPP system supporting WUS transmission. The wireless device 300 is configured to obtain (e.g. via the wireless interface 303), from the network node, a set of resource configuration parameters indicative of a WUS configuration. The wireless device 300 is configured to obtain (e.g. via the wireless interface 303), from the network node, a wireless device group identifier associated with the wireless device. The wireless device 300 is configured to determine (e.g. via the processor circuitry 302 and/or a determining circuitry 302A), based on the obtained set of resource configuration parameters, the wireless device group identifier and a set of resource configuration criteria, a WUS resource, out of one or more active resources, allocated to the wireless device. The wireless device 300 is configured to monitor (e.g. via the processor circuitry 302 and/or a monitoring circuitry 302B), the determined WUS resource for WUS.

The wireless device 300 may be configured to obtain (e.g. via the wireless interface 303), the set of resource configuration criteria.

The wireless device 300 is configured to communicate with the network node using wireless communications systems such as cellular systems (e.g. Narrowband IoT, e.g. low cost Narrowband IoT or category M).

The processor circuitry 302 is optionally configured to perform any of the operations disclosed in FIG. 3. The operations of the wireless device 300 may be embodied in the form of executable logic routines (e.g., lines of code, software programs, etc.) that are stored on a non-transitory computer readable medium (e.g., the memory circuitry 303) and are executed by the processor circuitry 302).

Furthermore, the operations of the wireless device 300 may be considered a method that the wireless circuitry is configured to carry out. Also, while the described functions and operations may be implemented in software, such functionality may as well be carried out via dedicated hardware or firmware, or some combination of hardware, firmware and/or software.

The memory circuitry 301 may be one or more of a buffer, a flash memory, a hard drive, a removable media, a volatile memory, a non-volatile memory, a random access memory (RAM), or other suitable device. In a typical arrangement, the memory circuitry 301 may include a non-volatile memory for long term data storage and a volatile memory that functions as system memory for the processor circuitry 303. The memory circuitry 301 may exchange data with the processor circuitry 303 over a data bus. Control lines and an address bus between the memory circuitry 301 and the processor circuitry 303 also may be present (not shown in FIG. 5). The memory circuitry 301 is considered a non-transitory computer readable medium.

The memory circuitry 301 may be configured to store the obtained set of resource configuration parameters, the wireless device group identifier and/or the set of resource configuration criteria, in a part of the memory based on the received software data.

FIG. 6 is a signaling diagram 500 illustrating an exemplary message exchange between an exemplary wireless device 300, an exemplary network node 400 and an exemplary core network node 600 during an exemplary paging operation.

In FIG. 6, the network node 400 and the wireless device 300 have performed a connection procedure. The network node 400 and the wireless device 300 may have obtained 501A and 501B a set of resource configuration criteria, as disclosed in S100 of FIGS. 2 and S200 of FIG. 3. The set of resource configuration criteria may be a predetermined configuration representing a set of rules to be used for WUS resource determination. The set of resource configuration criteria may comprise a set of resource allocation rules and a set of group mapping rules.

The network node 400 obtains 502 a number of wireless device groups supported by the communications network (as disclosed in S101 of FIG. 2). The network node 400 may obtain the number of wireless device groups from the core network node 600, such as e.g. an MME. The number of wireless device groups may be obtained by the network node 400 by being explicitly signaled from the core network node 600, such as the MME, or it may be manually configured, in the network node 400 e.g. by storing the number of wireless device groups on a memory accessible by the network node 400.

The network node 400 allocates 504 one or more active resources, out of a set of available resources, for WUS for the number of wireless device groups, based on the obtained number of wireless device groups supported by the communications network (as disclosed in S103 of FIG. 2).

The network node 400 determines 506, a WUS resource configuration defining a mapping of the wireless device groups to the determined one or more active resources, based on the set of resource configuration criteria (as disclosed in S105 of FIG. 2).

The network node 400 then provides 508, to the wireless device 300, a set of resource configuration parameters indicating the determined WUS resource configuration (as disclosed in S107 of FIG. 2 and in S201 of FIG. 3). The WUS resource configuration may be cell-specific and may comprise a mapping configuration, whether the mapping configuration is static or dynamic, and the active resources, such as the allocated resources, for WUS transmission. The set of resource configuration parameters may also comprise information about the wireless device groups mapped to each WUS resource. If the wireless device groups are uniformly distributed in the active resources, then the set of resource configuration parameters may only comprise the WUS resource density, such as the number of groups/WUS resource). The network node 400 may provide the set of resource configuration parameters by broadcasting (e.g. via system information) the set of resource configuration parameters to the wireless device.

The network node 400 provides 510, to the wireless device 300, a wireless device group identifier assigned to the wireless device 300 (as disclosed in S106 of FIGS. 2 and S203 in FIG. 3). The wireless device group identifier may be provided to the wireless device 300 via higher layer signalling from the core network node 600, such as an MME, or directly from the network node 400.

Based on the obtained set of resource configuration parameters, the wireless device group identifier and the set of resource configuration criteria, the wireless device 300 determines 512, a WUS resource, out of one or more active resources, allocated to the wireless device (as disclosed in S205 of FIG. 3). The WUS resource allocated to the wireless device is the WUS resource that the wireless device has to monitor for potential WUS transmission.

The wireless device monitors 514 the determined WUS resource for WUS (as disclosed in S205 of FIG. 3).

The network node 400 may receive 516 a paging message from the core network node 600 comprising a wireless device identifier and a wireless device group identifier for which WUS shall be transmitted. The wireless device group identifier for which WUS shall be transmitted may herein also be referred to as a WUS group ID.

The network node 400 then transmits 518, to the plurality of wireless device groups, WUS in accordance with the determined WUS resource configuration (as disclosed in S109 of FIG. 2)

When the wireless device detects a WUS in the WUS resource it monitors, the wireless device 300 may wake up 520 and may listen for and be ready to decode a paging signal (such as a Physical Downlink Control Channel (PDCCH) or a Physical Downlink Shared Channel (PDSCH)) at a subsequent paging occasion related to the transmission of the WUS signal.

The network node 400 may then send 522 a paging message comprising a wireless device identifier at the subsequent paging occasion.

When the wireless device identifier comprised in the paging message corresponds to the identifier of the wireless device 300, then the wireless device 300 may receive 524 the paging message.

The steps 501A to 514 as disclosed in FIG. 6 relate to a configuration stage and the steps 515 to 524 relate to an operational stage of a paging operation. The methods provided by the embodiments herein correspond to the configuration stage, i.e. the steps 501A to 514, of the paging operation disclosed in FIG. 6.

Embodiments of methods and products (network node and wireless device) according to the disclosure are set out in the following items:

Item 1. A method, performed by a network node in a communications network, for configuring resources to be used for Wake-up Signal, WUS, transmission to a plurality of wireless device groups in the communications network, the method comprising:
- obtaining (S101) a number of wireless device groups supported by the communications network;
- allocating (S103), based on the obtained number of wireless device groups supported by the communications network, one or more active resources, out of a set of available resources, for WUS for the number of wireless device groups;
- determining (S105), based on a set of resource configuration criteria, a WUS resource configuration defining a mapping of the wireless device groups to the determined one or more active resources, and
- providing (S107), to the wireless device, a set of resource configuration parameters indicative of the determined WUS configuration.

Item 2. The method according to Item 1, wherein the method further comprises:
- providing (S106), to the wireless device, a wireless device group identifier assigned to the wireless device.

Item 3. The method according to any of the previous items, wherein the WUS configuration specifies at least one of:
- which resources, out of the set of available resources that are active resources,
- the number of wireless device groups in each active resource,
- a pattern defining how to map the wireless device groups to the active resources,
- whether the pattern is varying over time.

Item 4. The method according to any of the previous items, wherein each available resource is associated with a specific set of transmission conditions, and wherein the set of configuration criteria is adapted to over time provide equivalent transmission conditions for WUS for all wireless device groups.

Item 5. The method according to item 4, wherein the transmission conditions relate to one or more of energy saving, signal quality, interference, paging probability and/or paging latency for the wireless device groups.

Item 6. The method according to any of the previous items, wherein the set of resource configuration parameters provided to the wireless device are indicative of one or more of:
- how many of the available resources are active resources,
- which resources, out of the set of available resources that are active resources,
- the number of wireless device groups in each active resource,
- a pattern defining how to map the wireless device groups to the active resources,
- whether the pattern is varying over time.

Item 7. The method according to item 6, wherein, when the pattern is varying over time, the set of resource configuration parameters is further indicative of how the pattern varies over time.

Item 8. The method according to any of the previous items, wherein the set of resource configuration parameters are values or an index on a table comprising multiple available resource configurations.

Item 9. The method according to any of the previous items, wherein the method comprises:
- transmitting (S109) to the plurality of wireless device groups, WUS in accordance with the determined WUS resource configuration.

Item 10. The method according to any of the previous items, wherein the set of available resources comprises four orthogonal resources, wherein two orthogonal resources are configured in the frequency domain and two orthogonal resources are configured in the time domain.

Item 11. The method according to any of the previous items, wherein the method comprises:
- obtaining (S100) the set of resource configuration criteria.

Item 12. A method, performed by a wireless device, for determining resources to monitor for Wake-Up Signals, WUS, from a network node, the method comprising:
- obtaining (S201), from the network node, a set of resource configuration parameters indicative of a WUS configuration;
- obtaining (S203), from the network node, a wireless device group identifier associated with the wireless device;
- determining (S205), based on the obtained set of resource configuration parameters, the wireless device group identifier and a set of resource configuration criteria, a WUS resource, out of one or more active resources, allocated to the wireless device,
- monitoring (S207) the determined WUS resource for WUS.

Item 13. The method according to item 12, wherein the set of resource configuration parameters obtained from the network node are indicative of one or more of:
- how many resources, out of a set of available resources, are active resources,
- which resources, out of the set of available resources that are active resources,
- the number of wireless device groups in each active resource,
- a pattern defining how to map the wireless device groups to the active resources,
- whether the pattern is varying over time.

Item 14. The method according to item 13, wherein, when the pattern is varying over time, the set of resource configuration parameters is further indicative of how the pattern varies over time.

Item 15. The method according to any of the items 12 to 14, wherein the set of configuration criteria are designed to provide equivalent WUS conditions for all wireless devices of the wireless device groups.

Item 16. The method according to item 15, wherein the WUS conditions relate to energy saving, signal quality, paging probability and/or paging latency for the wireless device groups.

Item 17. The method according to any of the item 12 to 16, wherein the method comprises:
- obtaining (S200) the set of resource configuration criteria.

Item 18. A radio network node comprising a memory circuitry, a processor circuitry, and a wireless interface, wherein the radio network node is configured to perform any of the methods according to any of items 1-11.

Item 19. A wireless device comprising a memory circuitry, a processor circuitry, and a wireless interface, wherein the wireless device is configured to perform any of the methods according to any of items 12-17.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1A-6 comprises some circuitries or operations which are illustrated with a solid line and some circuitries or operations which are illustrated with a dashed line. The circuitries or operations which are comprised in a solid line are circuitries or operations which are comprised in the broadest example embodiment. The circuitries or operations which are comprised in a dashed line are example embodiments which may be comprised in, or a part of, or are further circuitries or operations which may be taken in addition to the circuitries or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly to be regarded in an illustrative rather than restrictive sense. The claimed disclosure is intended to cover all alternatives, modifications, and equivalents.

The invention claimed is:

1. A method, performed by a network node in a communications network, for configuring resources to be used for Wake-up Signal (WUS) transmission to a plurality of wireless device groups in the communications network, the method comprising:
obtaining a number of wireless device groups supported by the communications network;
allocating, based on the obtained number of wireless device groups supported by the communications network, one or more active resources, out of a set of available resources, for WUS for the number of wireless device groups;
determining, based on a set of resource configuration criteria, a WUS resource configuration defining a mapping of the wireless device groups to the determined one or more active resources, and
providing, to the wireless device, a set of resource configuration parameters indicative of the determined WUS resource configuration, and wherein the WUS resource configuration specifies whether a pattern, defining how to map the wireless device groups to the active resources, is varying over time.

2. The method according to claim 1, wherein the set of resource configuration parameters provided to the wireless device are indicative of one or more of:
how many of the available resources are active resources,
which resources, out of the set of available resources that are active resources,
the number of wireless device groups in each active resource,
whether the pattern defining how to map the wireless device groups to the active resources,
whether the pattern is varying over time.

3. The method according to claim 1, wherein, when the pattern is varying over time, the set of resource configuration parameters is further indicative of how the pattern varies over time.

4. The method according to claim 1, wherein the set of resource configuration parameters are indicative of values or an index on a table comprising multiple available resource configurations.

5. The method according to claim 1, wherein the set of resource configuration criteria is a predetermined configuration representing a set of rules to be used for the WUS resource determination.

6. The method according to claim 5, wherein the set of rules are defined such that, in case the pattern defining how to map the wireless device groups to the active resources varies over time and has been indicated to the wireless device, the wireless device can derive when or where to monitor its own WUS group.

7. The method according to claim 6, wherein the set of rules are based on a timing reference.

8. The method according to claim 7, wherein the set of rules are based on a reference point in time, the reference point in time being based on a System Frame Number, SFN.

9. A method, performed by a wireless device, for determining resources to monitor for Wake-Up Signals (WUS) from a network node, the method comprising:
   obtaining, from the network node, a set of resource configuration parameters indicative of a WUS resource configuration;
   obtaining, from the network node, a wireless device group identifier associated with the wireless device, wherein obtaining comprises deriving the wireless device group identifier associated to the wireless device based on one or more parameters received from the network node and the wireless device's own wireless device unique identifier;
   determining, based on the obtained set of resource configuration parameters, the wireless device group identifier and a set of resource configuration criteria, a WUS resource, out of one or more active resources, allocated to the wireless device,
   monitoring the determined WUS resource for WUS, wherein the set of resource configuration parameters obtained from the network node are indicative of whether a pattern, defining how the map the wireless device groups to the active resources, is varying over time.

10. The method according to claim 9, wherein the set of resource configuration parameters obtained from the network node are indicative of one or more of:
   how many resources, out of a set of available resources, are active resources,
   which resources, out of the set of available resources that are active resources,
   the number of wireless device groups in each active resource.

11. The method according to claim 9, wherein, the set of resource configuration parameters is further indicative of how the pattern varies over time.

12. The method according to claim 9, wherein the set of resource configuration criteria are designed to provide equivalent WUS conditions for all wireless devices of the wireless device groups.

13. The method according to claim 12, wherein the WUS conditions relate to energy saving, signal quality, paging probability and/or paging latency for the wireless device groups.

14. The method according to claim 9, wherein the method comprises:
   obtaining the set of resource configuration criteria.

15. The method according to claim 9, wherein the set of resource configuration criteria is a predetermined configuration representing a set of rules to be used for the WUS resource determination.

16. The method according to claim 15, wherein the set of rules are defined such that, in case the pattern defining how to map the wireless device groups to the active resources varies over time and has been indicated to the wireless device, the wireless device can derive when or where to monitor its own WUS group.

17. The method according to claim 16, wherein the set of rules are based on a timing reference.

18. The method according to claim 17, wherein the set of rules are based on a reference point in time, the reference point in time being based on a System Frame Number, SFN.

19. A radio network node comprising a memory circuitry, a processor circuitry, and a wireless interface, wherein the radio network node is configured to perform the method of claim 1.

20. A wireless device comprising a memory circuitry, a processor circuitry, and a wireless interface, wherein the wireless device is configured to perform the method of claim 9.

* * * * *